June 30, 1959 E. S. TUPPER 2,892,595
PORTABLE STORAGE AND CRUSHING DEVICE
Filed Nov. 3, 1954 2 Sheets-Sheet 1
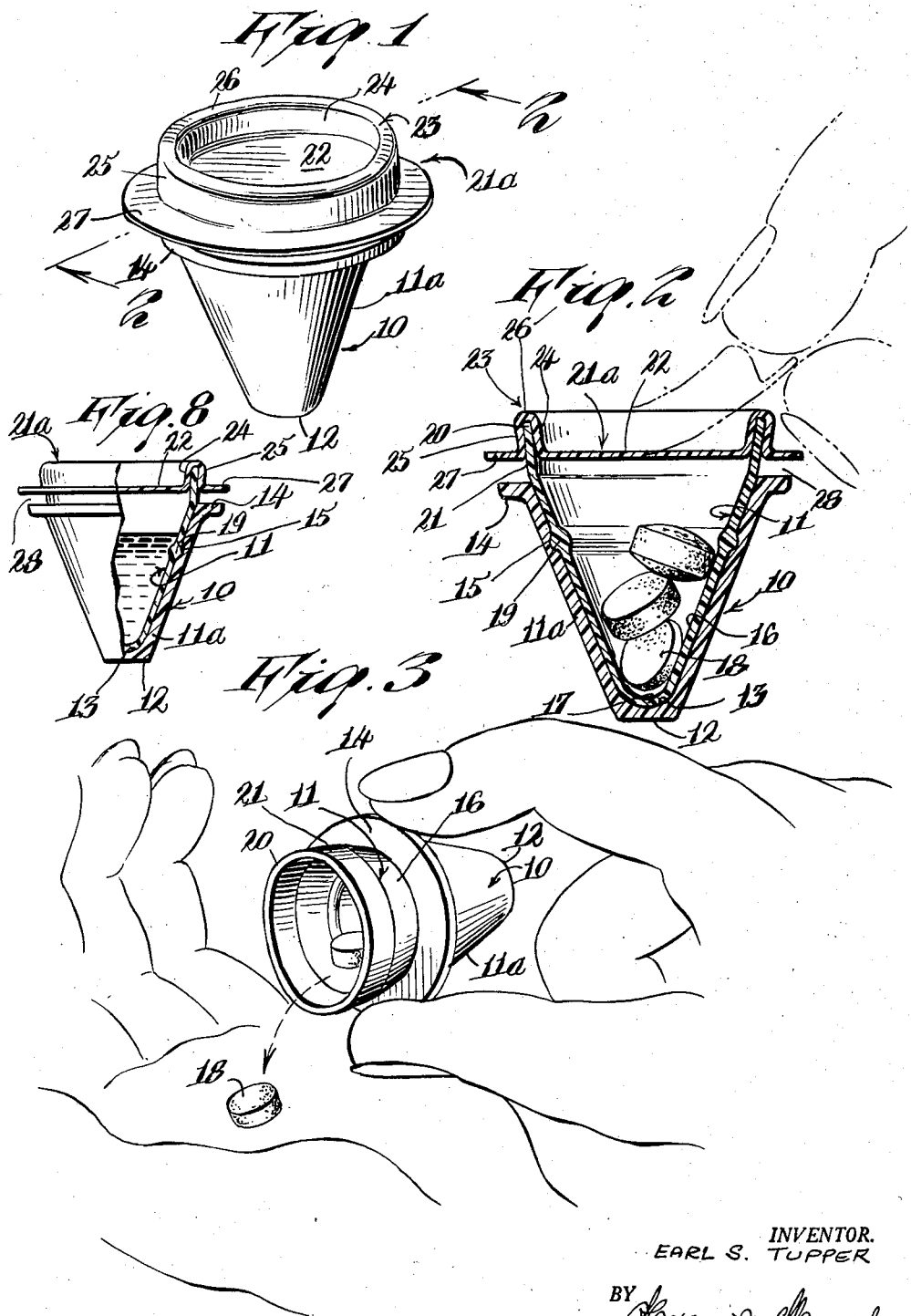
INVENTOR.
EARL S. TUPPER
BY
ATTORNEY June 30, 1959 — E. S. TUPPER — 2,892,595
PORTABLE STORAGE AND CRUSHING DEVICE
Filed Nov. 3, 1954 — 2 Sheets-Sheet 2
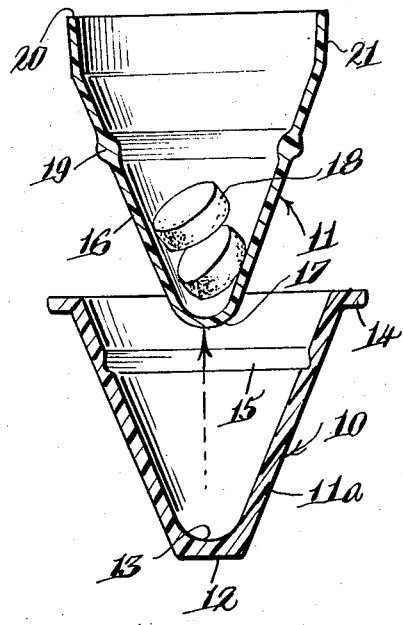
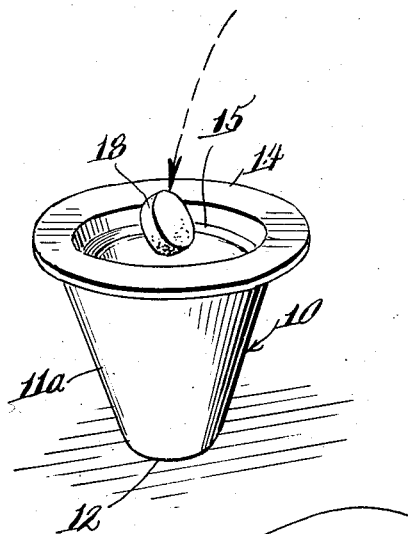
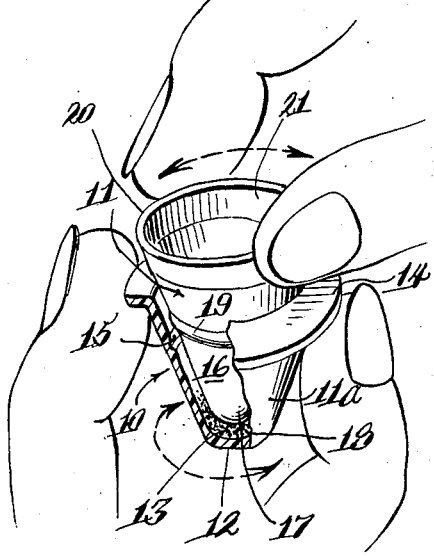
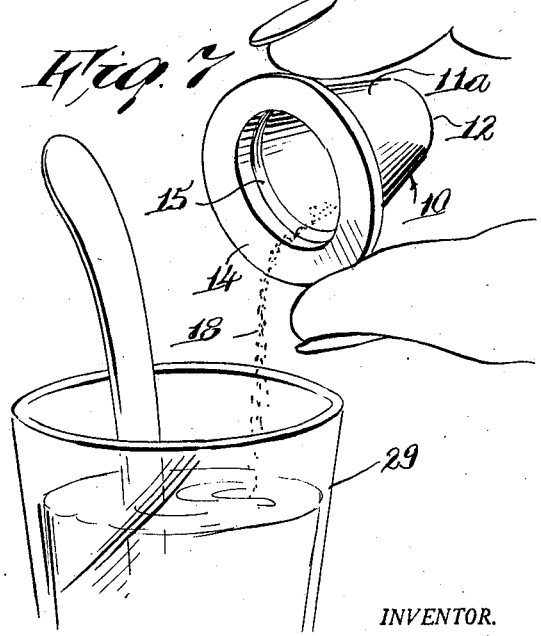
INVENTOR.
EARL S. TUPPER
BY
ATTORNEY United States Patent Office 2,892,595
Patented June 30, 1959

2,892,595
PORTABLE STORAGE AND CRUSHING DEVICE

Earl S. Tupper, Upton, Mass., assignor to Tupper Corporation, Smithfield, R.I., a corporation of Delaware Application November 3, 1954, Serial No. 466,640

2 Claims. (Cl. 241—199)

This invention relates generally to a combined portable storage and mortar and pestle device for materials intended either to be preserved in a seal proof manner such as chemicals, foods or medicinal tablets, and alternatively or selectively to serve as a grinding device for purposes of granulating said materials when required.

The main object of the invention is to provide a device of the above nature which is provided with insulating-effective double side walls and which is capable of being carried on the person and capable of being stored in a medicine chest, refrigerator or other place.

The device consists of a pair of nestable vessels of corresponding frusto-conical shape wherein the inner storage vessel is capable of relative rotation within the outer vessel for purposes of effecting crushing or granulation therebetween and wherein cooperating means are provided between the inner and outer vessels for purposes of centering and locking them in place in a detachable manner for purposes hereafter to be described.

A further feature of the invention resides in the provision of a device of the above nature wherein the inner vessel is provided with a projecting rim portion capable of receiving a seal-tight closure therefor.

Another feature of the invention resides in the provision of a device of the above nature wherein the cooperating vessels are capable of independent use.

A further feature of the invention resides in the provision of a device of the above nature which may be formed of a suitably hard plastic substance capable of granulating softer materials, and for this purpose polystyrene has been found to be suitable as an inert and contamination resistant material, although other materials having same sanitary, washable, non-porous, odorless and resisting qualities may be used.

A further feature of the invention resides in the provision of a device of the above kind which may act as an insulated type of fluid receptacle for medicinal and other purposes and adapted to be carried about the person or to be stored.

A further feature of the invention resides in the provision of a device of the above nature which is capable of standing on end and capable of serving as a measuring device.

A further feature of the device resides in the provision of a simple double-walled vessel capable of many applications and which is economical to manufacture, efficient, and durable.

These objects and other incidental ends and advantages of the invention will hereinafter appear in the progress of the disclosure and as pointed out in the appended claims.

Accompanying this specification are drawings showing a preferred form of the invention wherein:

Figure 1 is a view in perspective of the device in assembled and covered position.

Figure 2 is a sectional view of Figure 1 across the plane 2—2 thereof and showing the manner of removal of the cover member from the inner vessel.

Figure 3 is a view in perspective showing ejection of solid contents from the inner vessel when assembled and after removal of the cover member.

Figure 4 is a sectional view of Figure 2 showing the inner and outer vessel after the step of separation, and further showing medicinal pills disposed on the bottom of the inner vessel.

Figure 5 is a view in perspective of the outer vessel per se showing one of the pills being thrown therein for comminution purposes.

Figure 6 is a view in perspective showing the process of comminuation of the pill within the outer vessel and serving as a mortar with respect to the inner vessel which is relatively rotated in both directions and serving as a pestle.

Figure 7 is a view in perspective showing the pouring of the comminuted contents from the outer vessel into a glass.

Figure 8 is a reduced view partly in section showing the fully assembled device used for storage of a fluid.

In accordance with the invention and the preferred form shown, the portable storage and mortar and pestle assembly consists of an outer vessel generally indicated by numeral 10 and an inner interfitting vessel generally indicated by numeral 11. Outer vessel 10 has a peripheral conically shaped side wall 11a terminating in a flat bottom wall 12, the latter having a partially spherical inner surface 13 formed tangentially with the inner face of side wall 11a and serving as a mortar surface with the adjacent portions of the inner face of side wall 11a. Vessel 10 terminates at the upper open edge in a peripheral and outwardly extending horizontal flange 14. Spaced downwardly from flange 14 and on the inner face of wall 11a is a peripheral groove 15 adapted to receive and interlock with a corresponding bead or member 19 on the outer wall of inner vessel 11 as will hereinafter appear.

Inner vessel generally indicated by numeral 11 is similarly conically shaped and reduced in dimensions for nesting within outer vessel 10, being provided with a peripheral side wall 16 and a spherically shaped bottom wall portion 17 running tangentially with the adjacent side wall portions, bottom wall 17 at the outer face serving as a pestle in conjunction with the mortar surface 13 of outer container 10.

Inner vessel 11 is adapted to receive the material such as pills 18 for storage as seen in Figures 2, 3 and 4. A bead 19 at least disposed on the outer surface of wall 16 and below the upper edge 20 is provided to engage or interlock with the peripheral channel 15 on the inner face of wall 11a when the parts are in engaging position as best shown in Figures 2 and 8.

Inner vessel 11 spaced below top edge 20 is provided with a suitable offset side wall portion serving as a rim 21 to receive a cover member, the said rim projecting above flange 14 of the outer vessel when the two vessels are in interlocked relationship for purposes as will hereinafter appear.

Cover 21a is the same type of cover that is embraced in United States Patent No. 2,487,400 dated November 8, 1949 and issued to the applicant herein and is preferably formed of polyethylene or other substance which has local deformability, which does not absorb and is not readily wetted by water, is odorless and resistant to acids, alkalis, solvents and other chemicals at ordinary temperatures, is resistant to mildews, micro-organisms and insects. Cover 21a consists of a central wall 22 having a raised and inverted grooved generally indicated by numeral 23, said rim having an inner wall 24, an outer wall 25, and a top connecting wall 26 provided with a horizontally extending flange 27 proceeding from bottom of outer wall 25. Detachable engagement with wall portion 21 of inner vessel 11 is effected between the inner surface of groove wall 25 and the inner surface of connecting wall 26 at the corresponding outer and top faces of rim portion 21.

It is to be noted that for this purpose, the lateral dimension of the inner surface of groove wall 25 is less than the lateral dimension of the outer surface of rim portion 21 to effect a seal-tight engagement; and it is further to be noted that when the inner and outer vessels 10 and 11 are interlocked between the channel 15 and bead 19, a spacing 28 is provided betwen the lower wall of flange 27 and the upper wall of flange 14, as best shown in Figure 2. Such spacing enables the cover to be easily removed by placing the finger nail between flanges 27 and 14 at which time the cover may be stripped off in a peeling-off type of operation by virtue of the inherent characteristics of the locally deformable material such as polyethylene or other similar material from which the cover is made.

The interlocking engagement between channel 15 and bead 19 is frictionally effected so that inner vessel 11 may easily be removed from outer vessel 10 and conversely, so that the vessels may be interlocked in the conventional manner of resilient connections.

When vessels 10 and 11 are in interlocking engagement as shown in Figures 2 and 8, the walls thereof are preferably in contacting relationship throughout the inner surface area of vessel 10 and that portion of the outer surface area of vessel 11 below the projecting rim portion 21. However, during grinding operation as shown in Figure 6 wherein a tablet has first been introduced on the bottom surface 13 of vessel 11 and the inner vessel 11 at portion 17 is used as a pestle, bead 19 serves as a centering means for relative rotation of inner vessel 11 and bead 19 is disposed above channel 15. After comminution, the inner vessel 11 is removed and the contents from the outer vessel 10 are poured into the glass 29 as shown in Figure 7 for consumption.

The vessels 10 and 11 necessarily are of a resilient nature in order that the frictional and interlocking engagement between channel 15 and bead 19 be effected. However, during comminution or grinding when pestle portion 17 is spaced from mortar portion surface 13, the resilient material must have a predetermined degree of hardness to operate. A plastic of the hardness of polystyrene has been found satisfactory for practical purposes. When the device is in separated form, the outer vessel 10 is capable of standing on its end 12 and is capable of independent existence for any suitable purpose. On the other hand, the inner vessel 11 is also capable of independent use with cover member 21a thereon and may be carried and used independently of outer vessel 10.

When both vessels are used together for storing, there is the added advantage of having a double-walled device for insulating purposes. At the same time, as mentioned, the device has mortar and pestle facilities and is further provided with a seal-tight cover member for the inner vessel. Thus, the device is protected against contamination, moisture and evaporation. In addition either one of the vessels may be used as measuring devices or as drinking receptacles for any and all requirements.

It is distinctly understood that minor changes and variations in size, shape, location, combination of parts together with modifications of methods of molding and forming may all be resorted to without departing from the spirit of the invention and the scope of the appended claims.

I claim:

1. In a portable storage and crushing device, a pair of hollow and open-mouthed and conically-shaped interfitting resilient vessels, the inner vessel inner wall affording a storage chamber, an annular bead on the inner vessel outer wall movably and rotatably engageable with the outer vessel inner wall for spacing said walls for the formation of a crushing chamber and for initially crushing materials therebetween by downward and rotary pressure on the inner vessel, the outer vessel inner wall having an annular groove for rotatable interfitting and latching engagement with said bead upon further descent of the inner vessel after reduction in size of the crushing chamber for final comminution and for latching the vessels together.

2. In a portable storage and crushing device as set forth in claim 1 wherein the outer vessel has outwardly extending handling means at the top and the inner vessel has an upwardly projecting closeable rim, said rim projecting above the top of the inner vessel when said vessels are in interfitting engagement.

References Cited in the file of this patent

UNITED STATES PATENTS

| 1,274,597 | Reilly | Aug. 6, 1918 |
| 1,730,046 | Stow | Oct. 1, 1929 |
| 2,318,911 | Zweber | May 11, 1943 |
| 2,487,400 | Tupper | Nov. 8, 1949 |
| 2,496,396 | Kassel | Feb. 7, 1950 |
| 2,602,596 | Jones | July 8, 1952 |
| 2,663,463 | Benbury | Dec. 22, 1953 |
| 2,667,422 | Kauffman | Jan. 26, 1954 |
| 2,726,816 | Brantley | Dec. 13, 1955 |
| 2,767,711 | Ernst | Oct. 23, 1956 |

FOREIGN PATENTS

| 238,592 | Switzerland | Nov. 16, 1945 |